(12) United States Patent
Diaz

(10) Patent No.: US 7,173,941 B2
(45) Date of Patent: Feb. 6, 2007

(54) RESILIENT DETECTION OF REPEATERS

(75) Inventor: Raymond Diaz, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 973 days.

(21) Appl. No.: 10/086,569

(22) Filed: Feb. 28, 2002

(65) Prior Publication Data

US 2003/0161342 A1    Aug. 28, 2003

(51) Int. Cl.
*H04L 12/403*    (2006.01)
(52) U.S. Cl. ...................... 370/453; 370/463
(58) Field of Classification Search ............ None
See application file for complete search history.

(56) References Cited

U.S. PATENT DOCUMENTS

| | | | |
|---|---|---|---|
| 6,185,191 B1 | 2/2001 | Dipperstein | |
| 6,205,143 B1 | 3/2001 | Lemieux | |
| 6,208,670 B1 * | 3/2001 | Milliron et al. | 370/540 |
| 6,693,992 B2 * | 2/2004 | Jones et al. | 379/22.02 |
| 6,801,539 B1 * | 10/2004 | Rives | 370/466 |
| 6,973,600 B2 * | 12/2005 | Lau et al. | 714/704 |
| 2002/0057652 A1 * | 5/2002 | Schumann-Olsen et al. | 370/246 |

* cited by examiner

*Primary Examiner*—Huy D. Vu
*Assistant Examiner*—Toan D. Nguyen
(74) *Attorney, Agent, or Firm*—Fogg and Associates LLC; David N. Fogg; J. Patrick Kendrick

(57) ABSTRACT

An apparatus and method are detailed that allows for improved detection of communication devices and/or doublers in an associated physical communication links, in particular on HDSL communication links. The improved device apparatus and method additionally allows for the communication device to identify when all devices on a communication link have been detected and prevent premature termination of a discovery process. The improved device apparatus and method also allows the avoidance of improper detection of communication devices or doublers due to corrupted discovery response messages.

10 Claims, 4 Drawing Sheets

US 7,173,941 B2

RESILIENT DETECTION OF REPEATERS

TECHNICAL FIELD

The present invention relates generally to communication devices and in particular the present invention relates to detection of repeater units with communication devices.

BACKGROUND

Modern networks and network systems are typically constructed of multiple differing devices, elements, or links, referred to collectively herein as elements. These elements include communication devices that connect networks and other elements across a link. Links can be virtual links that connect through other communication devices or physical links that connect across physical wire, cables, wireless, or optical connections. Links can be of multiple protocols and physical connections and signaling methods. Telecommunication devices are specialized communication devices that connect networks and elements across links that are part of a telecommunications or phone system. Examples of such include, but are not limited to, digital subscriber line (DSL), ethernet links, modems, token ring, network hubs, network switches, wide area network (WAN) bridges, integrated services digital network (ISDN) devices, T1 termination units, etc. In particular, one recent such communications link and protocol is the high-speed digital subscriber line (HDSL), which has 2 wire and 4 wire variants.

Communication devices can have many physical configurations and implementations. Two popular physical configurations are the standalone enclosure and the line card chassis. Standalone enclosures, also called customer premise equipment (CPE) or remote (RMT) units, are typically used at end user sites or link terminal sites where only one device is required. Line card chassis, also called modular rack chassis, are popular in network hubs or telecommunication offices (also known as central offices or COs) where multiple communication links end and the density and central management capability of a line card chassis is an advantage. On a communication link such standalone or line card units are known as "terminal" units as they typically end or terminate the communication link.

Network communication distances have increased to the point where, in CPE communication device placements that are far from the CO communication device location, the signals from an originating communication device cannot easily reach the terminal or "far-end" communication device at the opposite end of the link. This has been additionally aggravated by the increasing device speeds and performance requirements of modern communication links and devices. The increased performance requirements and speed typically require an increased physical link quality and tend to further restrict the effective signaling distances of communication devices over the physical communication link. In these situations one or more signal repeaters or "doublers" may be used in the communication link to bridge the gap and enable the communication protocol to reach the receiving terminal communication device over lower quality physical links and/or at further distances from the originating device.

Many modern communication systems also typically have specifications that state how long a doubler can take to forward a received message to the next communication device or doubler in the communication link. This time period, for example, is 300 ms for a HDSL4 communication doubler. Other communication protocols that have similar forward timing requirements include, but are not limited to, HDSL2 and Single-pair High-speed Digital Subscriber Line (G.SHDSL).

With modern high performance communication links, in order to properly configure themselves, both communication devices at the opposite terminal ends of the link need to know how many doublers or other communication devices have been inserted in the link. This is also known as the "hop count" of the communication link. The communication devices therefore must either be informed of the number of doublers to expect on a communication link or go through a "discovery" phase to locate all intervening link doublers between it and the terminal communication device(s).

In discovery mode, an HDSL4 or HDSL2 communication device or doubler will send out a discovery query message over the communication link on an embedded operations channel (EOC) that is incorporated into the HDSL transfer protocol. The discovery query is received and repeated sequentially to all devices of the communication link. Each doubler and communication device in the communication link then sends back a response message to the querying device in turn that indicates their relative position in the communication link. This discovery process can happen either at communication device initialization or by insertion of the device into an operating communication link. The discovery process is concluded by a device performing discovery when a response is received from a terminal communication device. A problem can arise in discovery if a terminal communication device response is received before all of the intervening devices and doublers have responded. With the 300 ms message forwarding response time requirement of a communication link doubler such an occurrence is entirely possible, resulting in an incomplete hop count and an improperly configured communication device. It is also possible with the 300 ms messages forwarding response time, particularly on distorting or low quality physical links, to "corrupt" the message sequencing of the discovery response messages, such that the responses arrive out of order or even with the discovery response from a terminal communication device arriving before the remaining discovery messages of other doublers or communication devices in the link, prematurely closing the discovery process of the device performing discovery.

An additional problem can arise because of the message forwarding response time requirement of link doublers, in particular, the 300 ms message forwarding response time requirement in HDSL link doublers. With the forwarding response time of a communication link doubler it is possible for discovery responses from link devices to collide at a doubler if the device is responding to the discovery query as another response arrives from an upstream device. This can result in the corruption of one or more of the discovery response messages and/or sequencing of the discovery response messages and an incorrect count of intervening doublers and terminal communication devices being recorded by the device performing the discovery.

For the reasons stated above, and for other reasons stated below which will become apparent to those skilled in the art upon reading and understanding the present specification, there is a need in the art for a method and apparatus of conveniently detecting link doublers that are utilized with communication devices and communication links.

SUMMARY

The above-mentioned problems with apparatus of detecting link doublers that are utilized with communication devices and communication links are addressed by embodiments of the present invention and will be understood by reading and studying the following specification.

In one embodiment, a communication device comprises at least one communication interface, a communication interface circuit coupled to the at least one communication interface, wherein the communication interface circuit communicates using a communication protocol, wherein the communication protocol contains an embedded operation channel (EOC) and a hop count, wherein the communication interface circuit is adapted to send a discovery query and to receive discovery response messages over the EOC of the at least one communication interface, and wherein the communication interface circuit is adapted to compare a hop count from a discovery response message from a second communication device to a total number of received discovery response messages.

In another embodiment, a communication system comprises a communication link, a plurality of communication devices coupled to the communication link, wherein at least two communication devices of the plurality of communication devices are terminal communication devices, and wherein at least one of the plurality of communication devices includes at least one communication interface coupled to the communication link, a communication interface circuit coupled to the at least one communication interface, wherein the at least one communication interface circuit communicates using a communication protocol, wherein the communication protocol contains an embedded operation channel (EOC) and a hop count, wherein the communication interface circuit is adapted to send a discovery query to the plurality of communication devices coupled to the communication link and receive discovery response messages over the EOC from the plurality of communication devices, and wherein the communication interface circuit is adapted to compare a hop count from the discovery response message from one of the at least two terminal communication devices coupled to the communication link to a total number of received discovery response messages.

In a further embodiment, a High-speed Digital Subscriber Line (HDSL) communication device comprises at least one HDSL communication interface, an HDSL communication circuit coupled to the at least one HDSL communication interface, wherein the HDSL communication circuit communicates using HDSL communication protocol containing an embedded operation channel (EOC) and a hop count, wherein the HDSL communication circuit is adapted to send an HDSL discovery query and to receive HDSL discovery response messages over the EOC through the at least one HDSL communication interface, and wherein the HDSL communication circuit is adapted to compare a hop count from an HDSL discovery response message from a second HDSL communication device to a total number of received HDSL discovery response messages.

In yet another embodiment, a High-speed Digital Subscriber Line (HDSL) communication system comprises an HDSL communication link, and a plurality of HDSL communication devices coupled to the HDSL communication link, wherein at least two HDSL communication devices of the plurality of HDSL communication devices are terminal HDSL communication devices, and wherein at least one of the plurality of HDSL communication devices includes at least one HDSL communication interface coupled to the HDSL communication link, an HDSL communication interface circuit coupled to the at least one HDSL communication interface, wherein the at least one HDSL communication interface circuit communicates using an HDSL communication protocol, wherein the HDSL communication protocol contains an embedded operation channel (EOC) and a hop count, wherein the HDSL communication interface circuit is adapted to send a discovery query to the plurality of HDSL communication devices coupled to the HDSL communication link and receive discovery response messages over the EOC from the plurality of HDSL communication devices, and wherein the HDSL communication interface circuit is adapted to compare a hop count from the discovery response message from one of the at least two terminal HDSL communication devices coupled to the HDSL communication link to a total number of received discovery response messages.

In yet a further embodiment, a method of operating a communication device comprises sending a discovery request on an embedded operation channel (EOC), receiving at least one discovery response message from at least one other communication device, wherein at least one response message of the at least one discovery response message is a discovery response from a terminal communication device, extracting a hop count from the discovery response from the terminal communication device, and comparing the number of discovery response messages to a hop count of the discovery response message from the terminal communication device to determine if discovery is complete.

In another embodiment, a method of operating a communications system comprises transmitting a discovery request from a first communication device on an embedded operation channel (EOC), receiving at least one discovery response message from the at least one second communication device, wherein at least one response message of the at least one discovery response message is a discovery response from a terminal communication device, extracting a hop count from the discovery response from the terminal communication device, and determining if discovery is complete by comparing the number of discovery response messages to a hop count from the discovery response message of the terminal communication device.

In yet another embodiment, a method of operating a High-speed Digital Subscriber Line (HDSL) communication device comprises sending a discovery request on an embedded operation channel (EOC) of an HDSL communication link coupled to the HDSL communication device, receiving at least one discovery response message from at least one other HDSL communication device coupled to the HDSL communication link, wherein at least one response message of the at least one discovery response messages is a discovery response from a terminal HDSL communication device of the HDSL communication link, and comparing the number of discovery response messages to a hop count from the discovery response message from the terminal HDSL communication device to determine if discovery is complete.

In a further embodiment, a method of operating a Highspeed Digital Subscriber Line (HDSL) communication system comprises transmitting a discovery request from a first HDSL communication device on an embedded operation channel (EOC) of an HDSL communication link coupled to the first HDSL communication device and at least one second HDSL communication device, receiving at least one discovery response message from the at least one second HDSL communication device, wherein at least one response message of the at least one discovery response messages is a discovery response from a terminal HDSL communication device of the HDSL communication link, and determining if discovery is complete by comparing the number of discovery response messages to a hop count from the discovery response message from the HDSL terminal communication device.

In yet a further embodiment, a machine-usable medium having machine-readable instructions stored thereon for execution by a processor of a communication device to perform a method. The method comprising sending a discovery request on an embedded operation channel (EOC) of a communication link coupled to the communication device, receiving at least one discovery response message from at least one other communication device coupled to the communication link, wherein at least one response message of the at least one discovery response messages is a discovery response from a terminal communication device of the communication link, and comparing the number of discovery response messages to a hop count from the discovery response message from the terminal communication device to determine if discovery is complete.

Other embodiments are described and claimed.

DETAILED DESCRIPTION

Figure 1A:
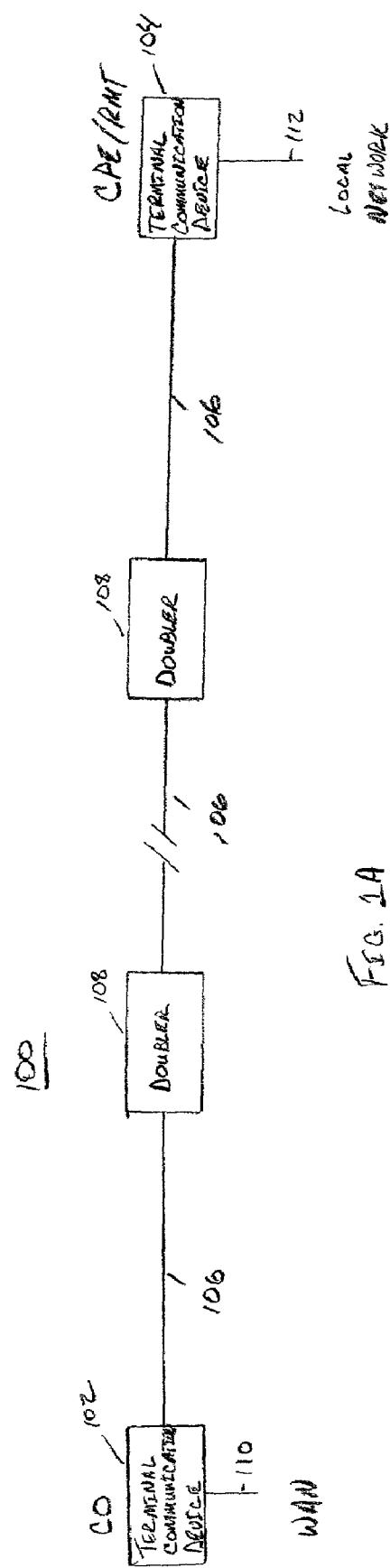
FIG. 1A is a simplified diagram of a communication system according to one embodiment of the present invention.

In the following detailed description, reference is made to the accompanying drawings that form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

As stated above, repeater or doubler detection and configuration in communication links is an involved task for communication devices and system operator. Because of the message forwarding time requirement of the doublers in the communication link the discovering communication device or doubler can prematurely end its discovery phase after receiving a discovery response message from a terminal device resulting in a misconfiguration of the discovering communication device or doubler and the inoperability of the communication link. Such misconfiguration can result in loss of service for the customer and may require manual intervention by the system operator to reset the communication system containing the communication link and the misconfigured communication device. Additionally, as stated above, in many cases collisions of discovery response messages may also occur because of message forwarding time requirements, corrupting the message sequencing and/ or the messages themselves and resulting in a misconfiguration because of one or more corrupt and missing response messages of the communication device or doubler performing discovery and the same potential loss of service and possible manual intervention.

Embodiments of the present invention utilize an improved circuitry and routines that compare an embedded hop count of the discovery response from the communication link's far-end terminal communication device to the total number of discovery response messages received. This enables the discovering communication device to resiliently verify the discovery by matching the number of detected devices to the hop count of the message of the terminal device and detect doublers and communication devices that would have been missed because of premature termination of the discovery phase. This ensures proper configuration of the communication device or doubler performing discovery on the communication link. Additionally, since communication device and doubler embodiments of the present invention compare the hop count of the discovery response from the communication link's far-end terminal communication device to the total number of discovery response messages received they detect discovery response messages that are corrupted or missing because of collisions at intervening doublers or from other causes. The improved detection of communication devices and doublers by communication device embodiments of the present invention improve proper communication device configuration and communication system configuration. This decreases communication system loss of service outages and increases system operator efficiency and customer productivity.

FIG. 1A is a simplified diagram of a communication system 100 according to one embodiment of the present invention. In FIG. 1A, communication system 100 contains two terminal communication devices 102, 104 that are coupled through a physical communication link 106 that contain a one or more optional link doublers 108. The central office (CO) communication device 102 transmits user data between a system or WAN 110 through communication link 106 and doublers 108 to the customer premise (CPE) or remote (RMT) communication device 104 and a local network or system 112 with a defined communication signaling protocol. Systems that could comprise the local network or system 112 include, but are not limited to, a standalone device, a phone system, or a computer network that utilizes T1, E1, ethernet, or ISDN. CPE communications device 104 in turn transmits user data between the local network or system 112 through the communication link 106 and doublers 108 to the CO communication device 102 and system or WAN 110 using the communication signaling protocol. As data packets or frames travel over the communication link 106 from CO communication device 102 to CPE communications device 104 or vice versa a hop count is incremented in each data packet as it passes through each communication device 102, 104 and doubler 108 in the communication system 100. An embedded operation channel (EOC) is also incorporated in the data packet or frame to allow limited bandwidth for a defined set of system operation commands and communication. One such set of system commands utilized over the EOC is discovery requests and discovery response messages.

In operation, a communication device 102, 104 conducting a discovery sends a discovery request out over an embedded operation channel (EOC) of the communication link 106. The discovery request travels through link 106 and is received by any optional link doublers 108 and communication device 102, 104 that form the far-end terminal communication device of the communication system 100 for the device 102, 104, conducting the discovery. Optional link doublers 108 and far-end terminal communication device 102, 104, upon reception of the discovery request from the communication device 102, 104 conducting the discovery, each reply with a discovery response message that is passed back through the communication link 106 through any intervening doublers 108 to the discovering communication device 102, 104. The discovering communication device 102, 104 records the discovery response messages as they arrive from communication link 106. When communication device 102, 104, conducting the discovery, receives a discovery response message over the EOC from the far-end terminal communications device 102, 104 it compares the hop count that is embedded in the message to the total number of received discovery response messages. If the hop count matches the total number of discovery response messages, the communication device 102, 104, conducting the discovery, closes the discovery phase of its link initialization process and proceeds with its configuration with the received response data. If the hop count of the far-end terminal communication device's response message does not match the total number of received discovery response messages, the communication device 102, 104, conducting the discovery, recognizes that it has not received the full set of discovery responses for proper configuration. At this stage the communication device 102, 104, conducting the discovery, will either restart the discovery phase process by issuing a new discovery request to the communication system 100, or, alternatively, wait for a selected period of time to receive any delayed discovery responses from the communication system 100 before re-comparing and restarting the discovery process if the hop count and number of discovery responses still do not match. This pausing and/or restarting of the discovery process until the number of discovery response messages match the hop count of the terminal communication device allows communication device embodiments of the present invention to resiliently discover and detect repeaters and other communication devices in the communication link. It is noted that discovery can occur from either terminal communication devices 102, 104 in both directions over the communication link 106; from either the CPE communication device 104 to the CO communication device 102, or from the CO communication device 102 to the CPE communication device 104.

In one embodiment, a bi-directional doubler 108, conducting a discovery, in the communication system 100 of FIG. 1A sends a discovery request out over the EOC of the communication link 106. However, because doubler 108 at least two interfaces, upstream (toward the CO communication device 102) and downstream (toward the CPE communication device 104), coupled to the communication link 106, discovery can be conducted in either direction, or both directions at the same time. The EOC discovery request of the discovering doubler travels through link 106 and is received by any additional intervening link doublers 108 and communication device 102, 104 that forms the far-end terminal communication device of the communication system 100 on the link direction (upstream or downstream) that discovery is being conducted on. Any additional intervening link doublers 108 and far-end terminal communication device 102, 104, upon reception of the discovery request from the doubler 108 conducting the discovery, each reply with a discovery response message that is passed back through the communication link 106 through any intervening doublers 108 to the discovering doubler 108. The discovering doubler 108 records the discovery response messages as they arrive from the communication link 106. When doubler 108, conducting the discovery, receives a discovery response message over the EOC from the far-end terminal communications device 102, 104 in the direction it is performing discovery in, it compares the hop count that is embedded in the message to the total number of received discovery response messages. If the hop count matches the total number of discovery response messages, doubler 108, conducting the discovery, closes the discovery phase of its link initialization process and proceeds with its configuration with the received response data. If the hop count of the far-end terminal communication device's response message does not match the total number of received discovery response messages, the doubler 108, conducting the discovery, recognizes that it has not received the full set of discovery responses for proper configuration. At this stage the doubler 108, conducting the discovery, will either restart the discovery phase process by issuing a new discovery request to the communication system 100, or, alternatively, wait for a selected period of time to receive any delayed discovery responses from the communication system 100 before re-comparing and restarting the discovery process if the hop count and number of discovery responses still do not match.

Figure 1B:
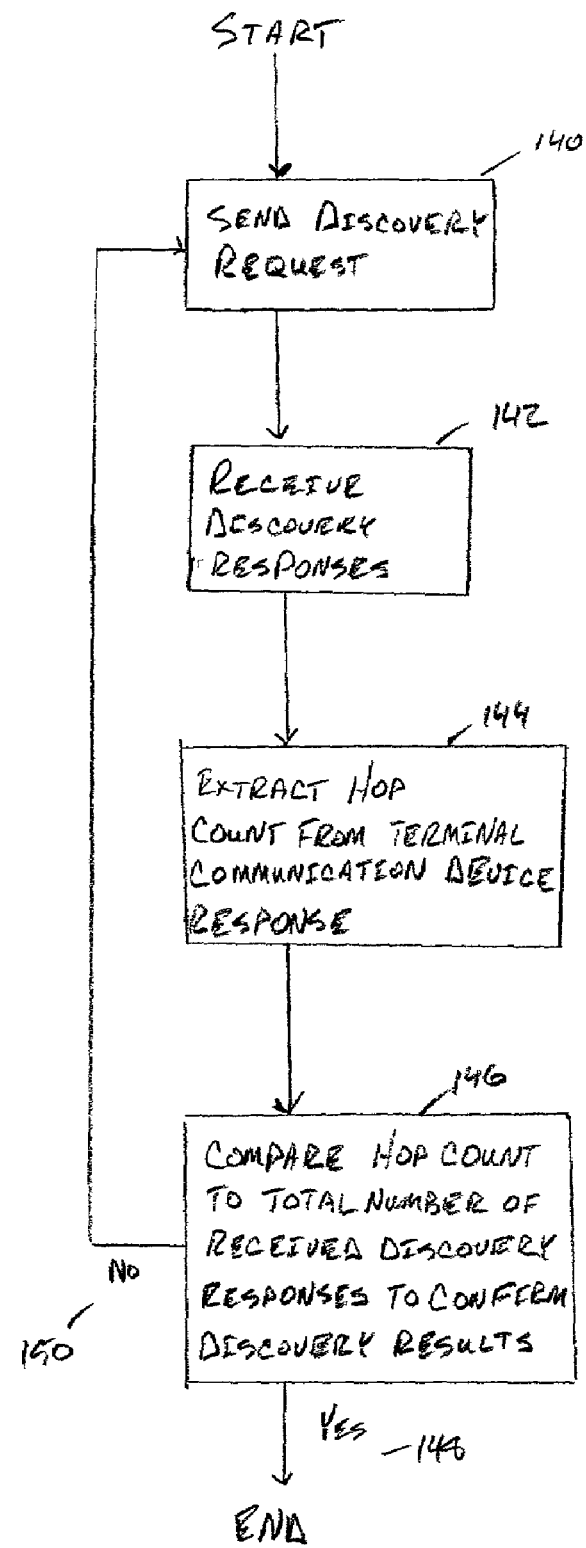
FIG. 1B is a simplified flowchart of a communication system discovery according to one embodiment of the present invention.

FIG. 1B is a simplified flowchart of a communication device discovery process according to one embodiment of the present invention. In FIG. 1B, a communication device conducting a discovery sends a discovery request out over an embedded operation channel (EOC) of a communication link. The discovery request is received by all communication devices and any optional link doublers coupled to the communication link. One such communication device forms the far-end terminal communication device of the communication system for the device conducting the discovery. Each communication device and doubler coupled to the communication link then reply with a discovery response message that is passed back through the communication link through any intervening doublers and communication devices to the communication device performing discovery. The discovering communication device receives 142 the discovery response messages as they arrive from communication link. When the communication device performing discovery receives a discovery response message over the EOC from the far-end terminal communications device it extracts 144 the hop count embedded in the message and compares the hop count 146 to the total number of received discovery response messages. If the hop count matches the total number of discovery response messages, the communication device conducting the discovery ends 148 the discovery phase of its link initialization process and proceeds with its configuration with the received response data.

If the hop count of the far-end terminal communication device's response message does not match the total number of received discovery response messages, the communication device conducting the discovery recognizes that it has not received the full set of discovery responses for proper configuration and restarts 150 the discovery phase process by issuing a new discovery request. Alternatively, the communication device conducting discovery will wait for a selected period of time to receive any delayed discovery responses from the communication system before re-comparing and restarting the discovery process if the hop count and number of discovery responses still do not match. This pausing and/or restarting of the discovery process until the number of discovery response messages match the hop count of the terminal communication device allows communication device embodiments of the present invention to resiliently discover and detect repeaters and other communication devices in the communication link.

In one embodiment, discovery is initiated by a communication device or doubler for a number of reasons: reset of the device, power up initialization, insertion into a communication system 100, or restoration of a communication link 106 signal at the device. It is also noted that other configurations of communication systems and communication devices incorporating embodiments of the present invention are possible and should be apparent to those skilled in the art with the benefit of the present disclosure.

An HDSL communication device is one type of communication device that is utilized in a modular rack chassis, CO, or CPE embodiment of the present invention. One embodiment of an HDSL modem line card communications device is the H4TU-R or H4TU-C systems made by ADC Telecommunications, Inc. Eden Prairie, Minn. The H4TU-R and H4TU-C HDSL modems contains several LAN dataports that include a T1 dataport, and a RS-232 craft port. The H4TU-R and H4TU-C HDSL modems also include an HDSL WAN dataport that is coupled to the downstream network.

Communication device software routines that initialize and operate a communication device are collectively referred to as firmware or ROM after the non-volatile read only memory (ROM) machine usable storage device that such routines have historically been stored in. It is noted that such firmware or ROM routines are stored on a variety of machine usable storage mediums that include, but are not limited to, a nonvolatile Flash memory, a read only memory (ROM), an electrically erasable programmable read only memory (EEPROM), a one time programmable (OTP) device, a complex programmable logic device (CPLD), an application specific integrated circuit (ASIC), a magnetic media disk, etc. It is also noted that communication devices can take multiple other physical forms, including, but not limited to, communication devices that are functions of other systems, or network elements that have the communication device functionality expressed in firmware or even hard-coded in a device such as an application-specific integrated circuit (ASIC) chip.

Figure 2A:
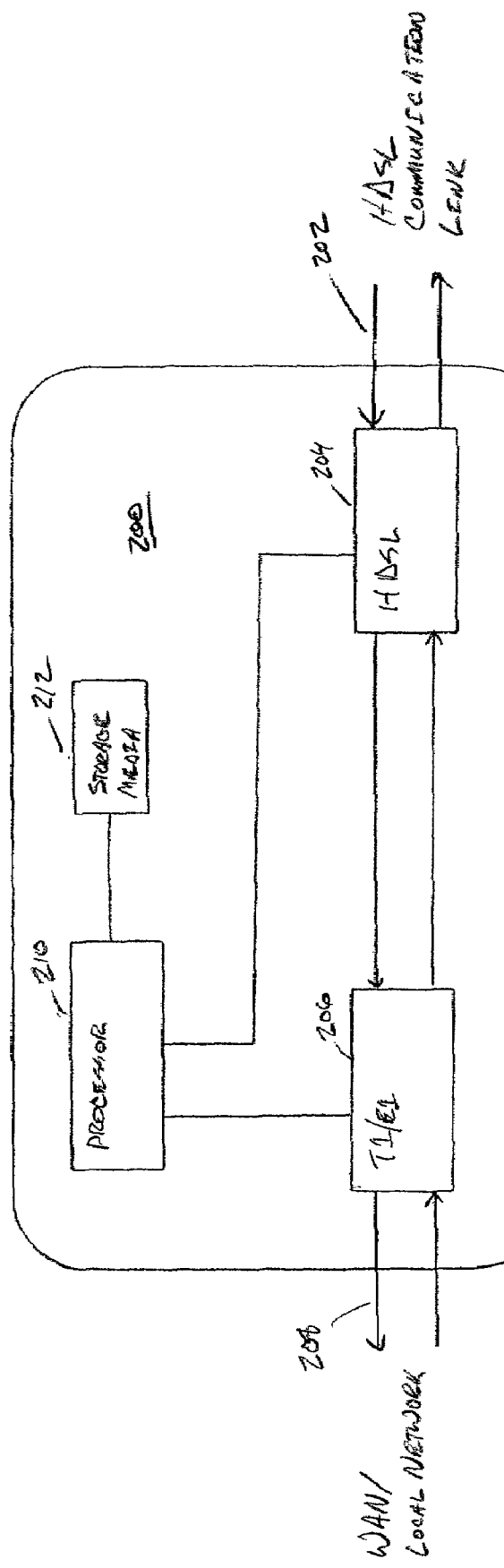
FIG. 2A is a simplified diagram of a HDSL communication device according to one embodiment of the present invention.

FIG. 2A is a simplified diagram of an HDSL communication device 200 according to one embodiment of the present invention. HDSL communication device 200 of FIG. 2A can be considered either a central office (CO) HDSL communication device or a customer premise equipment (CPE) or remote (RMT) HDSL communication device with either a two or four wire HDSL communication link 202 for the purposes of the present disclosure. In one embodiment, the communication device 200 has an HDSL interface 202 that is coupled to an HDSL communication link that utilizes HDSL communication signaling protocol. In one embodiment, HDSL communication device 200 includes a T1 or E1 interface 208 coupled to either a WAN (if a CO device) or a local network (if a CPE device) with a T-carrier T1 or E1 link 208 with American National Standards Institute (ANSI) T1.107 standard digital signal 1 (DS1) signaling. Communication device 200 internally contains a processor 210, T1/E1 interface circuit 206, HDSL interface circuit 204, and non-volatile machine usable firmware storage media 212, such as a Flash memory or the like. The HDSL interface circuit 204 is coupled to the HDSL interface 202 and the T1/E1 interface circuit 206 is coupled to the T1 interface 208 of the HDSL communication device 200.

Internally, HDSL interface circuit 204 is coupled to T1/E1 interface circuit 206 to pass data bi-directionally through the HDSL communication device 200 between the T1/E1 interface 208 to the HDSL interface 202. Processor 210 is coupled to T1/E1 interface circuit 206 and the HDSL interface circuit 204 and controls and communicates with them. Processor 210 is also coupled to the storage media 212, which contains software routines or firmware required to initialize, configure, and operate HDSL communication device 200. Storage media 212 also contains any software discovery routines that are utilized to initiate, configure, and run a discovery on the HDSL interface 202 from the HDSL communication device 200.

It is also noted that other communication interfaces, dataports, communication busses, and/or other proprietary communication interface or protocol can also be included in various embodiments of the HDSL communication device 200 of FIG. 2A, increasing communication options and configurations. An example of one such proprietary communication buss is the "Cellbus" communications chassis backplane bus of ADC Telecommunications, Inc. Eden Prairie, Minn.

In operation, the HDSL communication device 200 conducts a discovery by sending a discovery request out over an embedded operation channel (EOC) of a HDSL communication link coupled to its HDSL interface 202. The discovery request travels through the link and is received by any optional HDSL link doublers (not shown) and the communication device (not shown) that forms the far-end terminal communication device of the communication system for HDSL communication device 200. The optional HDSL link doublers and far-end HDSL terminal communication device upon reception of the discovery request from the HDSL communication device 200, each reply with a discovery response message that is passed back through the coupled HDSL communication link through any intervening doublers to the discovering HDSL communication device 200. The HDSL communication device 200 records the discovery response messages as they arrive at the HDSL interface 202 from the HDSL communication link. When the HDSL communication device 200 receives a discovery response message over the EOC from the far-end HSDL terminal communications device it compares the hop count that is embedded in the message to the total number of received discovery response messages. If the hop count matches the total number of discovery response messages, the HDSL communication device 200 closes the discovery phase of its HDSL interface 202 link initialization process and proceeds with its configuration with the received response data. If the hop count of the far-end HDSL terminal communication device's response message does not match the total number of received discovery response messages, the HDSL communication device 200 recognizes that it has not received the full set of discovery responses for proper configuration. The HDSL communication device 200 will either restart the discovery phase process by issuing a new discovery request to the coupled HDSL communication system, or, alternatively, wait for a selected period of time to receive any delayed discovery responses from the HDSL communication system before recomparing and restarting the discovery process if the hop count and number of discovery responses still do not match.

It is noted that other configurations of HDSL communication devices according to teachings of the present invention are possible and will be apparent to those skilled in the art with the benefit of the present disclosure.

Figure 2B:
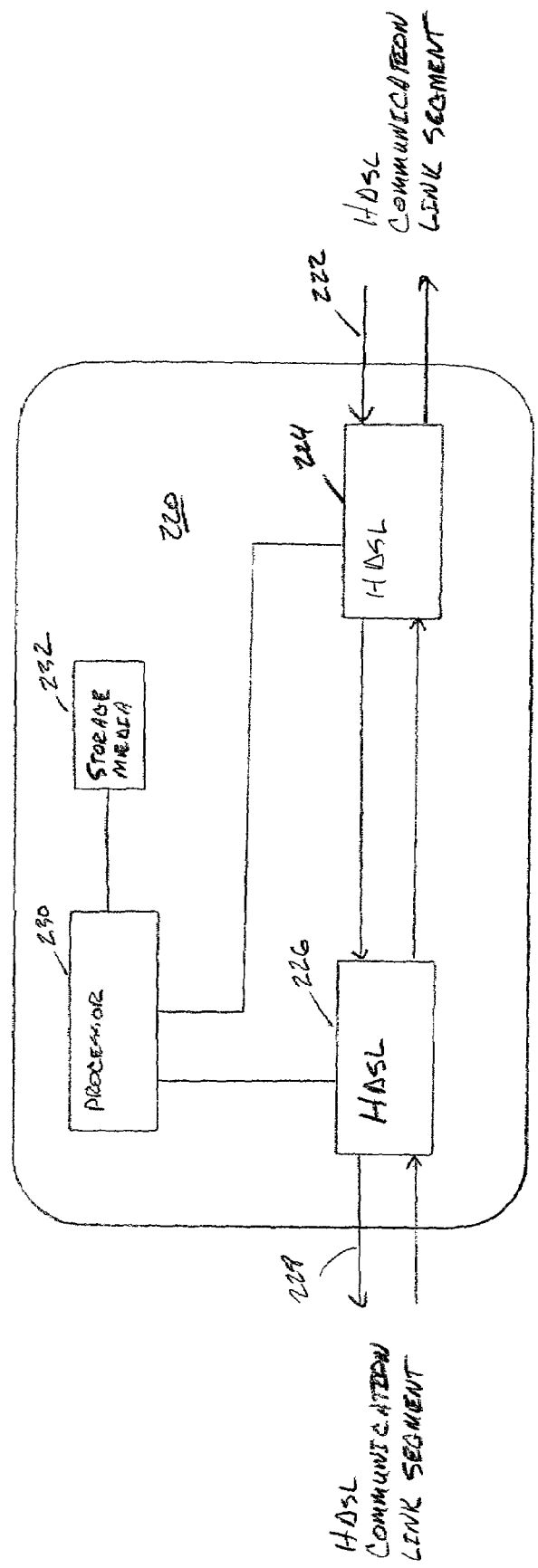
FIG. 2B is a simplified diagram of a HDSL doubler according to one embodiment of the present invention.

FIG. 2B is a simplified diagram of a HDSL communication doubler 240 according to one embodiment of the present invention. The HDSL doubler 240 of FIG. 2B can incorporate either two or four wire HDSL communication interfaces 222, 228 for the purposes of the present disclosure. In one embodiment, communication doubler 240 has a first HDSL interface 222 that is coupled to a first segment of a HDSL communication link and a second HDSL interface 228 that is coupled to a second segment of a HDSL communication link. The communication doubler 240 internally contains a processor 230, a first HDSL interface circuit 224, a second HDSL interface circuit 226, and storage media 232, such as a Flash memory or the like. The first HDSL interface circuit 224 is coupled to the first HDSL interface 222 and the second HDSL interface circuit 226 is coupled to the second HDSL interface 228 of the HDSL communication doubler 240.

Internally, the first HDSL interface circuit 224 is coupled to the second HDSL interface circuit 226 to pass data bi-directionally through the HDSL communication doubler 240 between the first HDSL interface 222 and the second HDSL interface 228. The processor 230 is coupled to the first HDSL interface circuit 224 and the second HDSL interface circuit 226 and communicates with and controls them. The processor 230 is also coupled to the non-volatile machine usable firmware storage media 232, which contains the software routines or firmware required to initialize, configure, and operate the HDSL communication doubler 240. The non-volatile machine usable firmware storage media 232 also contains any software discovery routines that are utilized to initiate, configure, and run a discovery on either the first HDSL interface 222 or the second HDSL interface 228 from the HDSL communication doubler 240.

It is also noted that other communication interfaces, dataports, communication busses, and/or other proprietary communication interface or protocol can also be included in various embodiments on the HDSL communication doubler 240 of FIG. 2B, increasing communication options and configurations.

In FIG. 2B, the HDSL communication doubler 240 conducts a discovery by sending a discovery request out over an embedded operation channel (EOC) of a HDSL communication link segment coupled to either of its HDSL interfaces 222, 228. However, because the HDSL communication doubler 240 has by definition at least two interfaces, upstream (toward a CO communication device) and downstream (toward the CPE communication device), coupled to the communication system (not shown), discovery can be conducted in either direction, or both directions at the same time. The discovery request travels through the link and is received by any additional HDSL link doublers (not shown) and the communication device (not shown) that forms the far-end terminal communication device of the communication link segment (not shown) for the HDSL communication doubler 240 HDSL interface 222, 228 which is conducting discovery. The optional HDSL link doublers and far-end HDSL terminal communication device upon reception of the discovery request from the HDSL communication doubler 240, each reply with a discovery response message that is passed back up the coupled HDSL communication link segment through any intervening doublers to the discovering HDSL communication doubler 240 and discovering HDSL interface 222, 228. The HDSL communication doubler 240 records the discovery response messages as they arrive at the HDSL interface 222, 228 from the HDSL communication link segment. When the HDSL communication doubler 240 receives a discovery response message over the EOC from the far-end HSDL terminal communications device it compares the hop count that is embedded in the message to the total number of received discovery response messages. If the hop count matches the total number of discovery response messages, the HDSL communication doubler 240 closes the discovery phase of the selected HDSL interface 222, 228 link initialization process and proceeds with its configuration with the received response data. If the hop count of the far-end HDSL terminal communication device's response message does not match the total number of received discovery response messages, the HDSL communication doubler 240 recognizes that it has not received the full set of discovery responses for proper configuration. The HDSL communication doubler 240 will either restart the discovery phase process by issuing a new discovery request to the coupled HDSL communication system, or, alternatively, wait for a selected period of time to receive any delayed discovery responses from the HDSL communication system before re-comparing and restarting the discovery process if the hop count and number of discovery responses still do not match.

It is noted that other configurations of HDSL doublers according to teachings of the present invention are possible and will be apparent to those skilled in the art with the benefit of the present disclosure.

Alternative communication device and doubler embodiments of the present invention with an improved repeater detection circuit and method will be apparent to those skilled in the art with the benefit of the present disclosure, and are also within the scope of the present invention.

CONCLUSION

An apparatus and method have been described that allows for improved detection of communication devices and/or doublers in an associated physical communication links, in particular on HDSL communication links. The improved device apparatus and method additionally allows for the communication device to identify when all devices on a communication link have been detected and prevent premature termination of a discovery process. The improved device apparatus and method also allows the avoidance of improper detection of communication devices or doublers due to corrupted discovery response messages.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication device, comprising:
   at least one communication interface;
   a communication interface circuit coupled to the at least one communication interface, wherein the communication interface circuit communicates using a communication protocol, wherein the communication protocol contains an embedded operation channel (EOC) and a hop count;
   wherein the communication interface circuit is adapted to send a discovery query and to receive discovery response messages over the EOC of the at least one communication interface;
   wherein the communication interface circuit is adapted to compare a hop count from a discovery response message from a second communication device to a total number of discovery response messages received from the second communication device and any intervening communication devices; and
   wherein the communication interface circuit is adapted to resend the discovery query if the total number of discovery response messages received does not match the hop count from the discovery response message from the second communication device.

2. A communication device, comprising:
   at least one communication interface;
   a communication interface circuit coupled to the at least one communication interface, wherein the communication interface circuit communicates using a communication protocol, wherein the communication protocol contains an embedded operation channel (EOC) and a hop count;
   wherein the communication interface circuit is adapted to send a discovery query and to receive discovery response messages over the EOC of the at least one communication interface;
   wherein the communication interface circuit is adapted to compare a hop count from a discovery response message from a second communication device to a total number of discovery response messages received from the second communication device and any intervening communication devices; and
   wherein the communication interface circuit is adapted to resend the discovery query if the number of received discovery response messages does not match the hop count from the discovery response message from the second communication device after a selected waiting period from the time the discovery response message from the second communication device was received.

3. A communication system, comprising:
   a communication link;
   a plurality of communication devices coupled to the communication link, wherein at least two communication devices of the plurality of communication devices are terminal communication devices, and wherein at least one of the plurality of communication devices comprises:
      at least one communication interface coupled to the communication link;
      a communication interface circuit coupled to the at least one communication interface, wherein the at least one communication interface circuit communicates using a communication protocol, wherein the communication protocol contains an embedded operation channel (EOC) and a hop count;
      wherein the communication interface circuit is adapted to send a discovery query to the plurality of communication devices coupled to the communication link and receive discovery response messages over the EOC from the plurality of communication devices;
      wherein the communication interface circuit is adapted to compare a hop count from the discovery response message from one of the at least two terminal communication devices coupled to the communication link to a total number of discovery response messages received from the one of the at least two terminal communication devices and any intervening communication devices of the plurality of communication devices; and wherein the communication interface circuit of the at least one communication device is adapted to resend the discovery query if the number of received discovery response messages does not match the hop count from the discovery response message from one of the at least two terminal communication devices of the communication system.

4. A communication system, comprising:
a communication link;
a plurality of communication devices coupled to the communication link, wherein at least two communication devices of the plurality of communication devices are terminal communication devices, and wherein at least one of the plurality of communication devices comprises:
at least one communication interface coupled to the communication link;
a communication interface circuit coupled to the at least one communication interface, wherein the at least one communication interface circuit communicates using a communication protocol, wherein the communication protocol contains an embedded operation channel (EOC) and a hop count;
wherein the communication interface circuit is adapted to send a discovery query to the plurality of communication devices coupled to the communication link and receive discovery response messages over the EOC from the plurality of communication devices;
wherein the communication interface circuit is adapted to compare a hop count from the discovery response message from one of the at least two terminal communication devices coupled to the communication link to a total number of discovery response messages received from the one of the at least two terminal communication devices and any intervening communication devices of the plurality of communication device; and
wherein the communication interface circuit of the at least one communication device is adapted to resend the discovery query when the number of received discovery response messages does not match the hop count after a selected waiting period from the time the discovery response message from one of the at least two terminal communication devices was received.

5. A High-speed Digital Subscriber Line (HDSL) communication device, comprising:
at least one HDSL communication interface;
an HDSL communication circuit coupled to the at least one HDSL communication interface, wherein the HDSL communication circuit communicates using HDSL communication protocol containing an embedded operation channel (EOC) and a hop count;
wherein the HDSL communication circuit is adapted to send an HDSL discovery query and to receive HDSL discovery response messages over the EOC through the at least one HDSL communication interface;
wherein the HDSL communication circuit is adapted to compare a hop count from an HDSL discovery response message from a second HDSL communication device to a total number of HDSL discovery response messages; and
wherein the HDSL communication circuit is adapted to resend the discovery query when the total number of discovery response messages received does not match the hop count from the discovery response message from the second HDSL communication device.

6. A High-speed Digital Subscriber Line (HDSL) communication system, comprising:
an HDSL communication link; and
a plurality of HDSL communication devices coupled to the HDSL communication link, wherein at least two HDSL communication devices of the plurality of HDSL communication devices are terminal HDSL communication devices, and wherein at least one of the plurality of HDSL communication devices comprises:
at least one HDSL communication interface coupled to the HDSL communication link;
an HDSL communication interface circuit coupled to the at least one HDSL communication interface, wherein the at least one HDSL communication interface circuit communicates using an HDSL communication protocol, wherein the HDSL communication protocol contains an embedded operation channel (EOC) and a hop count;
wherein the HDSL communication interface circuit is adapted to send a discovery query to the plurality of HDSL communication devices coupled to the HDSL communication link and receive discovery response messages over the EOC from the plurality of HDSL communication devices;
wherein the HDSL communication interface circuit is adapted to compare a hop count from the discovery response message from one of the at least two terminal HDSL communication devices coupled to the HDSL communication link to a total number of discovery response messages received from the one of the at least two terminal HDSL communication devices and any intervening HDSL communication devices of the plurality of HDSL communication devices; and
wherein the HDSL communication interface circuit of the at least one HDSL communication device is adapted to resend the discovery query if the number of received discovery response messages does not match the hop count from the discovery response message from one of the at least two terminal HDSL communication devices of the HDSL communication system.

7. A method of operating a communication device, comprising:
sending a discovery query on an embedded operation channel (EOC);
receiving discovery response messages from at least one terminal communication device and any intervening communication devices;
extracting a hop count from a discovery response message from the terminal communication device;
comparing a total number of discovery response messages received from the terminal communication device and any intervening communication devices to a hop count of the discovery response message from the terminal communication device to determine if discovery is complete; and
resending the discovery query when the number of received discovery response messages does not match the hop count of the discovery response message from the terminal communication device.

8. A method of operating a communication device, comprising:
sending a discovery query on an embedded operation channel (EOC);

receiving discovery response messages from at least one terminal communication device and any intervening communication devices;

extracting a hop count from a discovery response message from the terminal communication device;

comparing a total number of discovery response messages received from the terminal communication device and any intervening communication devices to a hop count of the discovery response message from the terminal communication device to determine if discovery is complete; and resending the discovery query if the number of received discovery response messages does not match the hop count of the discovery response message from the terminal communication device after a selected waiting period from the time the discovery response message from the terminal communication device was received.

9. A method of operating a communications system, comprising:

transmitting a discovery query from a first communication device on an embedded operation channel (EOC);

receiving discovery response messages from at least one terminal communication device and any intervening communication devices;

extracting a hop count from a discovery response from the at least one terminal communication device;

determining if discovery is complete by comparing a total number of discovery response messages received from the terminal communication device and any intervening communication devices to the hop count from the discovery response message from the at least one terminal communication device; and re-transmitting a discovery query when the number of received discovery response messages does not match the hop count from the discovery response message from the terminal communication device.

10. A method of operating a communications system, comprising:

transmitting a discovery query from a first communication device on an embedded operation channel (EOC);

receiving discovery response messages from at least one terminal communication device and any intervening communication devices;

extracting a hop count from a discovery response from the at least one terminal communication device;

determining if discovery is complete by comparing a total number of discovery response messages received from the terminal communication device and any intervening communication devices to the hop count from the discovery response message from the at least one terminal communication device; and re-transmitting a discovery query when the number of received discovery response messages does not match the hop count from the discovery response message from the terminal communication device after a selected waiting period from the time the discovery response message from the terminal communication device was received.

* * * * *